United States Patent
Sekiguchi

(10) Patent No.: US 12,335,604 B2
(45) Date of Patent: Jun. 17, 2025

(54) IMAGE CAPTURING APPARATUS AND CONTROL METHOD AND NON-TRANSITORY COMPUTER-READABLE STORAGE MEDIUM

(71) Applicant: CANON KABUSHIKI KAISHA, Tokyo (JP)

(72) Inventor: Tomohiro Sekiguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 18/067,572

(22) Filed: Dec. 16, 2022

(65) Prior Publication Data
US 2023/0209178 A1 Jun. 29, 2023

(30) Foreign Application Priority Data
Dec. 24, 2021 (JP) .................. 2021-211448

(51) Int. Cl.
*H04N 23/63* (2023.01)
*H04N 23/65* (2023.01)

(52) U.S. Cl.
CPC ......... *H04N 23/633* (2023.01); *H04N 23/651* (2023.01)

(58) Field of Classification Search
CPC .. H04N 23/633; H04N 23/651; H04N 23/631; H04N 23/667; H04N 5/06; H04N 23/63; G11B 27/34; G11B 27/323; G03B 17/18
See application file for complete search history.

(56) References Cited

U.S. PATENT DOCUMENTS

| | | | |
|---|---|---|---|
| 2003/0156212 A1 | 8/2003 | Kingetsu | |
| 2009/0310009 A1* | 12/2009 | Ejima | H04N 1/2145 348/E5.022 |
| 2012/0154609 A1* | 6/2012 | Ozaki | H04N 9/8042 348/207.99 |
| 2012/0176537 A1* | 7/2012 | Nakamura | G11B 27/322 348/E7.003 |
| 2013/0155286 A1 | 6/2013 | Yumisaki | |
| 2013/0162638 A1* | 6/2013 | Kunihara | H04N 13/161 345/419 |
| 2015/0350593 A1* | 12/2015 | Arai | H04N 5/772 386/232 |

(Continued)

FOREIGN PATENT DOCUMENTS

JP 2003244529 A 8/2003
JP 2004165806 A 6/2004

*Primary Examiner* — Timothy J Henn
(74) *Attorney, Agent, or Firm* — Canon U.S.A., Inc. IP Division

(57) ABSTRACT

Some embodiments of an image capturing apparatus include a first display unit capable of displaying a captured image and a second display unit configured to display information related to image capturing, where the apparatus comprises a generating unit configured to generate a timecode corresponding to a frame rate at which an image capturing unit performs image capturing; a first display control unit configured to control so as to display the timecode generated in the generating unit on the first display unit at first intervals; and a second display control unit configured to control so as to display the timecode generated in the generating unit on the second display unit at second intervals that are longer than the first intervals.

17 Claims, 10 Drawing Sheets

(56) References Cited

U.S. PATENT DOCUMENTS

| | | |
|---|---|---|
| 2018/0041712 A1* | 2/2018 | Nakagawara .......... H04N 23/63 |
| 2019/0011805 A1 | 1/2019 | Ota |
| 2020/0275020 A1* | 8/2020 | Minoshima .......... H04N 23/951 |
| 2021/0193186 A1* | 6/2021 | Krupnik ................. H04N 5/772 |

* cited by examiner

F I G. 6A
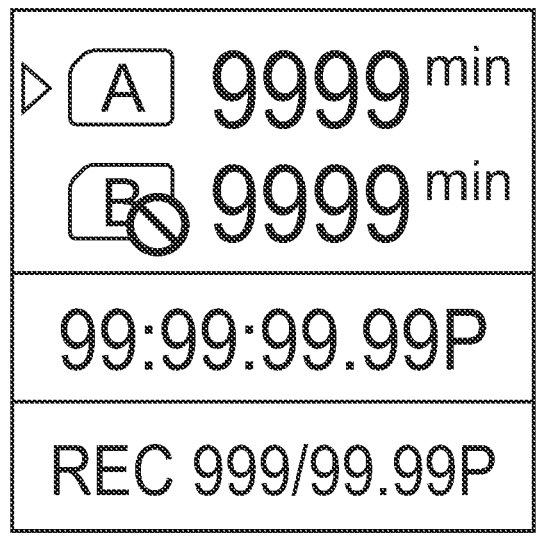
F I G. 6B
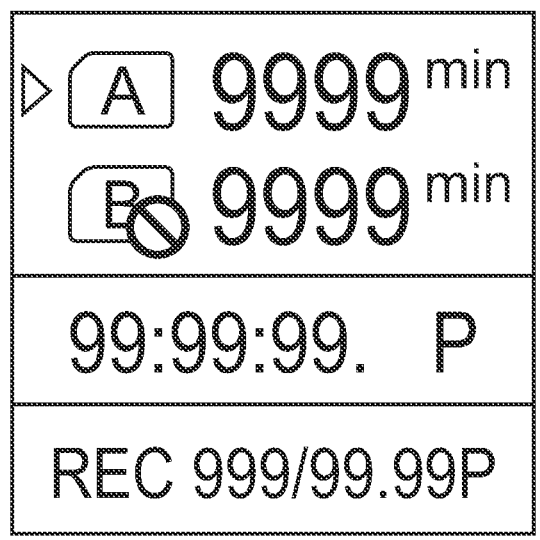

IMAGE CAPTURING APPARATUS AND CONTROL METHOD AND NON-TRANSITORY COMPUTER-READABLE STORAGE MEDIUM

BACKGROUND

Field of the Disclosure

The present disclosure relates to an image capturing apparatus and a control method and a non-transitory computer-readable storage medium.

Description of the Related Art

Image capturing apparatuses typified by digital cameras are provided with a display panel capable of displaying a state of the camera, such as camera setting information including shutter speed, white balance setting, and auto focus setting, the number of still images and a duration of video that can be recorded in a recording medium, and warning information. There also are apparatuses that display the above information on a display screen even when power is off.

Since display panels, such as LCD panels, provided in digital cameras usually display images obtained by an image capturing sensor in live view, they are often driven at 60 Hz or 30 Hz. However, it is necessary to suppress power consumption in order to display information on a display panel while power is off. Therefore, it is necessary to keep intervals for updating a display of the display panel short.

Patent Document 1, Japanese Patent Laid-Open No. 2003-244529, describes a technique for causing a frame rate of a display apparatus to be lower than a reference frame rate when a processing load of a camera is greater than a reference load of the camera in normal operation.

However, the above Patent Document 1 reduces a frame rate of a display apparatus to reduce a processing load of a camera when the processing load is large and does not suppress power consumption when the processing load of the camera is not large.

SUMMARY

The present disclosure provides a technique for displaying a timecode while suppressing power consumption.

The present disclosure in a first aspect provides an image capturing apparatus including a first display unit capable of displaying a captured image and a second display unit configured to display information related to image capturing, the apparatus comprising: a generating unit configured to generate a timecode corresponding to a frame rate at which an image capturing unit performs image capturing; a first display control unit configured to control so as to display the timecode generated in the generating unit on the first display unit at first intervals; and a second display control unit configured to control so as to display the timecode generated in the generating unit on the second display unit at second intervals that are longer than the first intervals.

The present disclosure in a second aspect provides a method of controlling an image capturing apparatus including a first display unit capable of displaying a captured image and a second display unit configured to display information related to image capturing, the method comprising:

(a) generating a timecode corresponding to a frame rate at which an image capturing unit performs image capturing;
(b) controlling so as to display the timecode generated in the step (a) on the first display unit at first intervals; and
(c) controlling so as to display the timecode generated in the step (a) on the second display unit at second intervals that are longer than the first intervals.

The present disclosure in a third aspect provides a non-transitory computer-readable storage medium storing a program which, when read and executed by a computer, causes the computer to execute the steps of a method of controlling an image capturing apparatus including a first display unit capable of displaying a captured image and a second display unit configured to display information related to image capturing, the method comprising:

(a) generating a timecode corresponding to a frame rate at which an image capturing unit performs image capturing;
(b) controlling so as to display the timecode generated in the step (a) on the first display unit at first intervals; and
(c) controlling so as to display the timecode generated in the step (a) on the second display unit at second intervals that are longer than the first intervals.

According to the present disclosure, it is possible to display a timecode while suppressing power consumption.

Further features of various embodiments will become apparent from the following description of exemplary embodiments (with reference to the attached drawings).

BRIEF DESCRIPTION OF THE DRAWINGS

FIGS. 6A and 6B are diagrams illustrating examples of displays of display screens to be displayed on a display panel in the second embodiment.

DESCRIPTION OF THE EMBODIMENTS

Figure 1A:
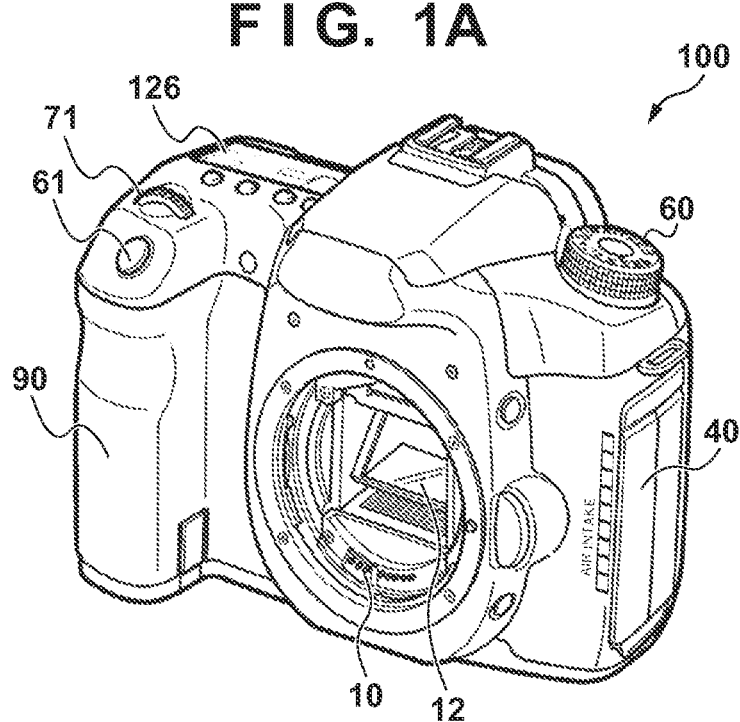
FIGS. 1A and 1B are external views of an image capturing apparatus in the present embodiment.

Hereinafter, embodiments will be described in detail with reference to the attached drawings. Note, the following embodiments are not intended to limit the scope of the disclosure. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

Figure 1B:
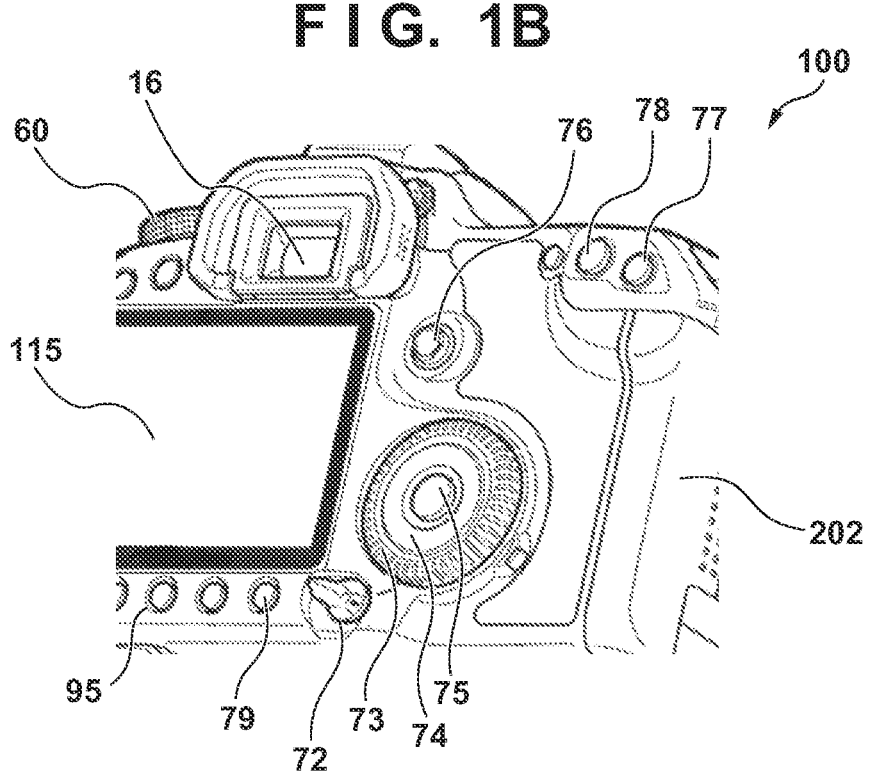

FIGS. 1A and 1B illustrate external views of a digital camera 100 as an example of an image capturing apparatus in which the present embodiment is applicable. FIG. 1A is a front perspective view of the digital camera 100, and FIG. 1B is a rear perspective view of the digital camera 100. A display unit 115 is provided on the back of the apparatus and displays captured images and various information. A display unit 126 provided outside of a viewfinder and on an upper surface of the digital camera displays various setting values of the camera, which includes shutter speed and aperture, or a timecode, which will be described later. The display unit 115 has a high resolution because it is also used by a user to confirm captured images. In contrast, the display unit 126 displays information held in the apparatus, such as parameters and a timecode pertaining to image capturing, by displaying symbols, such as characters and signs, as a black-and-white binary image, and its resolution is also much lower than that of the display unit 115. A shutter button 61 is an operation unit for performing an image capturing instruction. A mode changeover switch 60 is an operation unit for switching among various modes. A terminal cover 40 is a cover for protecting connectors (not illustrated), such as that of a cable for connecting an external device and the digital camera 100. A main electronic dial 71 is a rotational operation member included in an operation unit 107, and setting values, such as shutter speed and aperture, can be changed by rotating the main electronic dial 71. A power supply switch 72 is an operation member for switching a power supply of the digital camera 100 on and off. A sub-electronic dial 73 is a rotational operation member included in the operation unit 107 and is used for moving a selection frame, scrolling through images, and the like. Further, on an inner side of the sub-electronic dial 73 is provided a four-way directional key 74 as a part of the operation unit 107. The four-way directional key 74 is structured to be capable of being pressed down in upper, lower, left, and right portions, respectively, and processing corresponding to a portion pressed by the user is performed. For example, an operation for selecting a menu item is performed by the user operating the four-way directional key 74. A set button 75 is included in the operation unit 107 and is a push button that is mainly used for determining a selection item and the like. An LV button 76 is a part of the operation unit 107 and is a button for switching the live view (hereinafter, LV) on and off in a menu button. In a moving image capturing mode, the LV button 76 is used for instructing to start and stop capturing (recording) of a moving image. An enlargement button 77 forms a part of the operation unit 107 and is an operation button for switching an enlargement mode on and off while the live view is being displayed in the image capturing mode and changing an enlargement ratio during the enlargement mode. In a reproduction mode, the enlargement button 77 functions as an enlargement button for increasing a ratio for enlarging a reproduced image. A reduction button 78 forms a part of the operation unit 107 and is a button for decreasing the enlargement ratio of an enlarged reproduced image to reduce a displayed image. A reproduction button 79 forms a part of the operation unit 107 and is an operation button for switching between the image capturing mode and the reproduction mode. It is possible to transition to the reproduction mode and cause the latest image of images recorded in a first recording medium 105 or a second recording medium 106 to be displayed on a display unit 28 by pressing the reproduction button 79 during the image capturing mode. An assign button 95 is a button that forms a part of the operation unit 107 and to which a user can freely assign a function. The assign button 95 functions as a button for displaying a status screen in an initial state, and it can be assigned with another function, such as a function of changing setting contents or a status related to capturing and reproduction of a moving image or a function of starting capturing (recording) of a moving image. It is also possible to assign a function of displaying the status screen to an assign button other than the assign button 95. The status screen is a screen configured by a plurality of pages, which display setting contents or a state related to capturing and reproduction of a moving image, an internal state of the digital camera, and the like.

A quick return mirror 12 is raised/lowered by an actuator (not illustrated) by being instructed by a system control unit 50. A communication terminal 10 is a communication terminal for the digital camera 100 to communicate with a (detachable) lens. An ocular viewfinder 16 is a look-through-type viewfinder for confirming focus and composition of an optical image of a subject obtained through a lens unit 101. Inside the ocular viewfinder 16 is housed a display unit for simply displaying parameters pertaining to image capturing and the like outside of a frame for displaying an optical image.

A cover 202 is a cover for slots in which the first recording medium 105 and the second recording medium 106 are stored. A grip portion 90 is a holding portion, which has a shape that it easy for the user to hold with their right hand when the user holds the digital camera 100.

This concludes a description pertaining to a structure of a digital camera serving as a display apparatus in which embodiments are to be applied. Hereinafter, a description will be given for first to third embodiments based on the above structure.

First Embodiment

Figure 2:
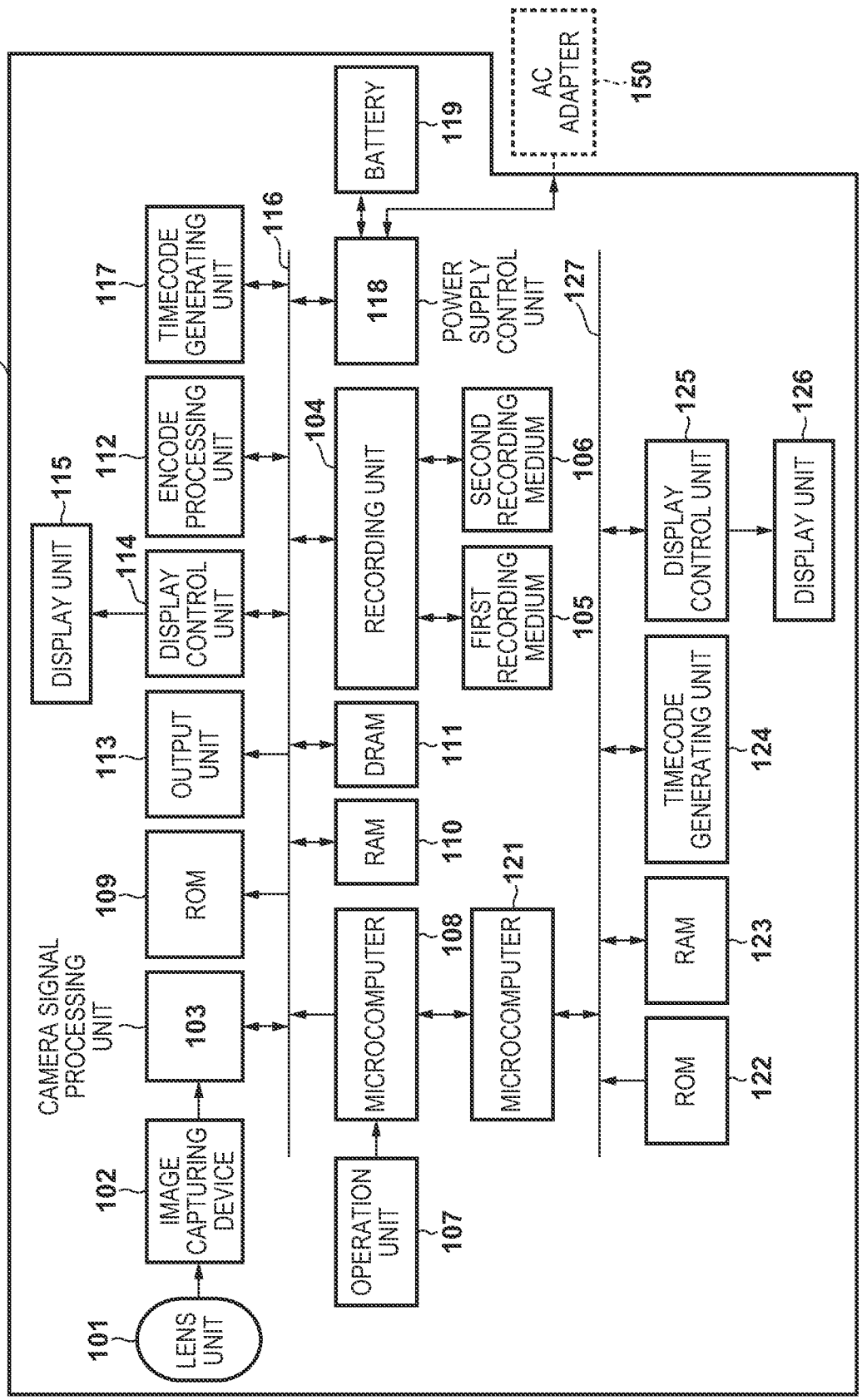
FIG. 2 is a block diagram of a schematic configuration of the image capturing apparatus in the present embodiment.

FIG. 2 is a block diagram of the digital camera 100 in the first embodiment.

The lens unit 101 forms a subject image, which has entered, on an image capturing surface of an image capturing device 102. The lens unit 101 is configured by a fixed lens group, zoom lens group, diaphragm, and correction lens group for collecting light, and the correction lens group serves a function of correcting an image forming position moved by a movement of the zoom lens group and a function of adjusting focus.

The image capturing device 102 is, for example, a complementary metal oxide semiconductor (CMOS) image sensor or the like and converts incident light intensity into a charge amount to generate an image signal. The image capturing device 102 outputs an image signal of a 4K image (4096 pixels horizontally×2160 pixels vertically) at 60 frames per second.

A camera signal processing unit 103 performs predetermined processing on an image signal from the image capturing device 102 and outputs processed image data.

An encode processing unit 112 generates encoded data by encoding each frame of a moving image (4K moving image) obtained by the camera signal processing unit 103 using inter-frame predictive coding or the like in compression units of Group of Pictures (GOP). A type of encoding method is not particularly limited; however, it is assumed that encoding is performed in accordance with H.264, for example.

A recording unit 104 records encoded moving image data generated by the encode processing unit 112 as a moving image file on the first recording medium 105 or the second recording medium 106. Both the first recording medium 105 and the second recording medium 106 may be the same type of memory cards or different types of memory cards. The recording unit 104 also manages moving image files recorded on the first recording medium 105 and the second recording medium 106 according to a predetermined file system.

The operation unit 107 functions as a means for the user to input various instructions to the digital camera 100. The operation unit 107 then supplies input of instructions from the user to a microcomputer 108. As already described, the operation unit 107 includes a start/stop button for instructing recording of a moving image, a menu button for instructing a change of settings, and a display switching button for instructing a change of a display content of the display units 115 and 126, and the like.

The microcomputer 108 functions as a main microcomputer for controlling the entire digital camera 100. A ROM 109 is a non-volatile memory, such as a flash ROM, and stores programs to be executed by the microcomputer 108, various parameters, and the like. A RAM 110 is a volatile memory used as a work area by the microcomputer 108.

A DRAM 111 is a volatile memory that is used for temporarily storing image data that is to be processed and has been processed by the camera signal processing unit 103, the encode processing unit 112, and the recording unit 104. Specifically, the camera signal processing unit 103 stores developed image data in the DRAM 111. The encode processing unit 112 reads a series of image data stored in the DRAM 111, compresses these, and writes encoded image data back in the DRAM 111. The recording unit 104 sequentially reads out encoded video data in the DRAM 111 and records it on the first recording medium 105 or the second recording medium 106.

An output unit 113 performs output to an external display apparatus in a predetermined digital format, such as an HDMI® signal or SDI signal for video signals. A display control unit 114 is a means for controlling a display of an image by the display unit 115 and, in accordance with an instruction from the microcomputer 108, displays video data on the display unit 115 after superimposing it with various setting menus, a title, a timecode generated by a timecode generating unit 117. The display unit 115 includes, for example, a liquid crystal panel and displays an image under the control of the display control unit 114. It is assumed that the display control unit 114 in the embodiment updates the display unit 115 at 60 Hz. This is for realizing a live view display at a frame rate of a moving image. The display control unit 114 can also display an image on the display unit 115 after superimposing it with various messages or the like. A bus 116 is used for transmitting data and control signals between the aforementioned elements of the digital camera 100.

A power supply control unit 118 is configured by a battery detection circuit, a DC-DC converter, a switching circuit for switching among blocks to be powered, and the like and detects whether or not a battery 119 is mounted, a type of the battery 119, and a remaining battery amount of the battery 119. The power supply control unit 118 also controls the DC-DC converter based on a detection result and an instruction of the microcomputer 108 and supplies a necessary voltage for a necessary period to the respective units including the display unit 126. The battery 119 is a primary battery, such as an alkaline battery or a lithium battery, or a secondary battery (rechargeable battery), such as an NiCd battery, an NiMH battery, or an Li battery.

The power supply control unit 118 also includes a terminal for connecting an AC adapter 150 (external power supply apparatus) other than the battery 119. If the AC adapter 150 is connected, the power supply control unit 118 can charge the battery 119 with power from the AC adapter as well as supply that power to each circuit of the digital camera 100 so as to enable the digital camera 100 to operate. Therefore, the power supply control unit 118 can determine whether an AC adapter is connected from a voltage of the terminal for connecting an AC adapter and can notify the determination result to the microcomputer 108. A configuration may also be taken so as to provide a sensor for detecting a connection/disconnection of an AC adapter to/from the terminal.

A microcomputer 121 functions as a sub-microcomputer in the digital camera 100. Main processing of the microcomputer 121 in the present embodiment is control of the display unit 126 via a bus 127. The microcomputer 108 and the microcomputer 121 are connected by a serial bus and can transmit and receive data to and from each other via the serial bus. A ROM 122 is a ROM, such as a flash ROM, and stores programs to be executed by the microcomputer 121 and the like. A RAM 123 is a volatile memory used as a work area by the microcomputer 121.

A display control unit 125 displays various setting menus and a timecode generated by a timecode generating unit 124 on the display unit 126 according to an instruction from the microcomputer 121.

This timecode counted by the timecode generating unit 124 can be changed by a setting from the microcomputer 121. Although details will be described later, the microcomputer 121 communicates with the microcomputer 108 at predetermined intervals to obtain a timecode that is counted by the timecode generating unit 117 on the microcomputer 108 side. The microcomputer 121 then sets the obtained timecode in the timecode generating unit 124. As a result, synchronization between the timecode generating unit 117 and the timecode generating unit 124 is achieved at the above predetermined intervals.

As illustrated in FIG. 2, the digital camera 100 of the embodiment is configured by two independent buses, which are the bus 116 to which the microcomputer 108 is connected and the bus 127 to which the microcomputer 121 is connected. The camera signal processing unit 103, the display control unit 114, the encode processing unit 112, the recording unit 104, and the like, which are directly connected to the bus 116, which is directly connected to the microcomputer 108, need to process image data obtained from the image capturing device 102 within a preset time. Therefore, an operation clock of the processing units on the bus 116 is sufficiently high and a transmission bandwidth of the bus 116 is sufficiently wide. Meanwhile, the number of processing units directly connected to the bus 127, which is directly connected to the microcomputer 121, is less than that of the bus 116. Since the main processing of the microcomputer 121 is control of a display of the display unit 126 via the bus 127, the transmission bandwidth of the bus 127 is much narrower than that of the bus 116. Therefore, a clock for the operation of the processing units connected to the bus 127 including the microcomputer 121 and a data transfer clock of the bus 127 is much lower than the clocks in the microcomputer 108 and the bus 116. As a result, the power consumed in the microcomputer 121 and the processing units connected to the bus 127 can be made sufficiently smaller than the power consumed in the microcomputer 108 and the processing units connected to the bus 116.

Figure 3A:
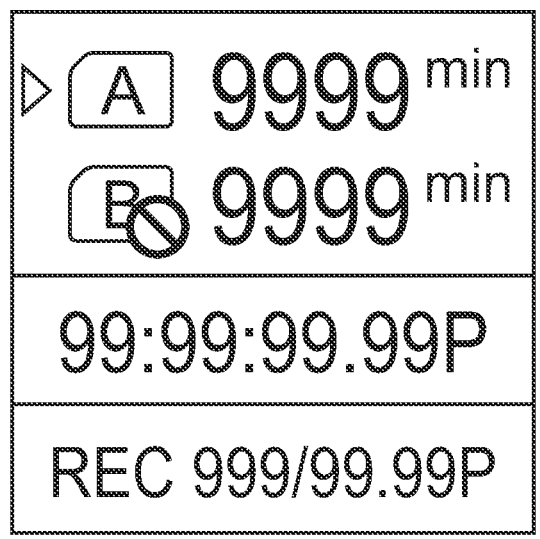
FIGS. 3A to 3C are diagrams illustrating examples of displays of display screens to be displayed on a display panel in a first embodiment.
Figure 3B:
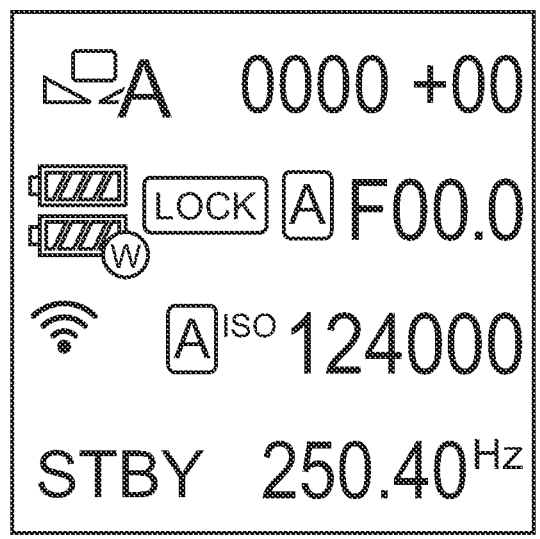
Figure 3C:
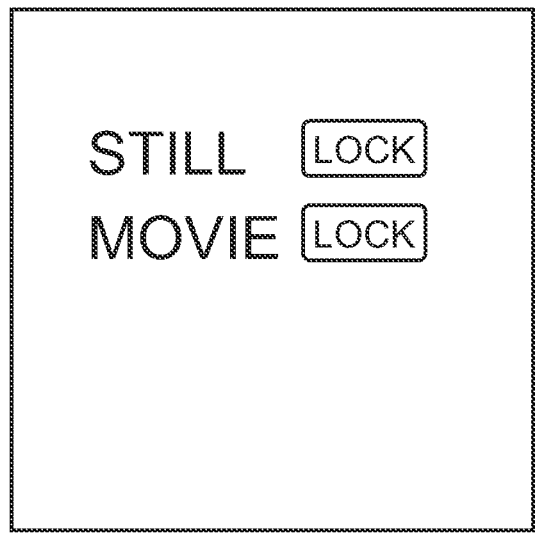

FIGS. 3A to 3C illustrate examples of screens to be displayed on the display unit 126 in the present embodiment. FIG. 3A is a screen for displaying a timecode. On this screen is displayed a timecode, which is "hour:minute:second-.frame", generated by the timecode generating unit 124. It is assumed that a moving image to be captured/recorded in the present embodiment is 60 frames/second (60 fps). The intervals for updating the display unit 126 by the display control unit 125 in the embodiment are ¹⁄₁₅ second (15 Hz). Therefore, the "frame", which is in the least significant digit position of the timecode displayed on the display unit 126, is not incremented by 1 and is displayed as 0, 4, 8, and so on in increments of 4 frames.

FIG. 3B is an example of a screen other than the screen for the timecode, which is displayed on the display unit 126. In the figure, WB, an F value, an ISO value, and the like are displayed. Unlike FIG. 3A, in FIG. 3B, the display control unit 125 updates the display content of the display unit 126 only when a value of the displayed information is changed by the user's operation.

A configuration may be taken such that the screen to be displayed on the display unit 126 is switched between FIGS. 3A and 3B each time the user performs an on/off operation of a predetermined button of the operation unit 107.

FIG. 3C is an example of a screen to be displayed on the display unit 126 when the power of the digital camera 100 is off. It displays a state that has been set before the digital camera 100 is powered off. Therefore, the screen is not updated while the power is off. Further, by a configuration being taken so as to supply power to the display control unit 125 and the display unit 126, it is made possible to display as illustrated even when the power is turned off.

The screen on the display unit 126 is switched by the user pressing a display panel screen display switching button (not illustrated) provided on the operation unit 107. Each time this button is pressed, the microcomputer 108 notifies the microcomputer 121 that there has been a press of the above button. Each time the microcomputer 121 receives a notification from the microcomputer 108, the microcomputer 121 controls the display control unit 125 to switch alternatingly between the screens of FIGS. 3A and 3B as the screen display on the display unit 126. However, when the microcomputer 121 receives from the microcomputer 108 a notification that there has been a power-off operation, the microcomputer 121 sets the latest setting information in the display control unit 125. Consequently, the display unit 126 display the screen illustrated in FIG. 3C. Thereafter, the microcomputer 121 returns a response for the power-off notification to the microcomputer 108. After receiving this response, the microcomputer 108 sets in the power supply control unit 118 an instruction for turning the power of the digital camera off and transitions to a power off state.

Figure 8:
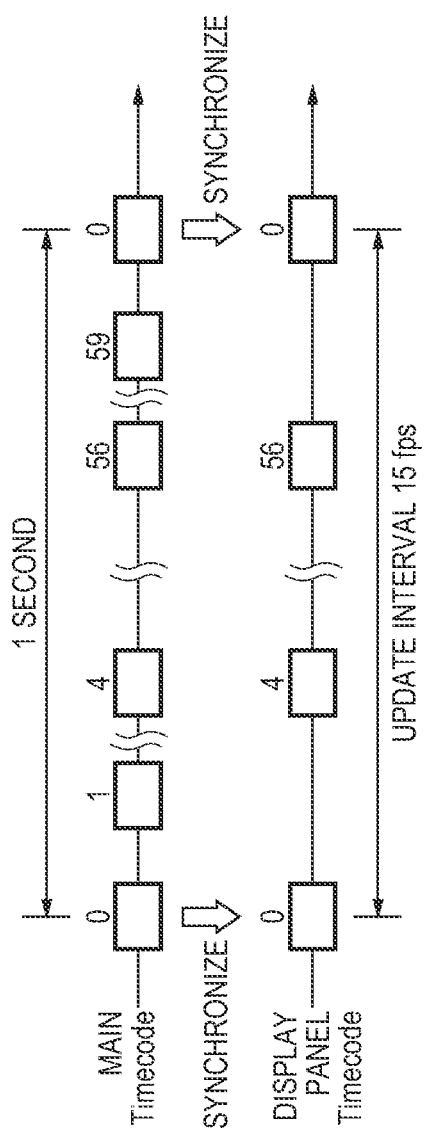
FIG. 8 is a diagram illustrating timecode synchronization in the first embodiment.

FIG. 8 is a diagram illustrating a timing for synchronizing timecodes in the embodiment.

A "main timecode" in the figure is a timecode generated by the timecode generating unit 117, is a high-precision timecode, and is the same as the timecode to be displayed on the display unit 115. Since the moving image frame rate of the digital camera 100 in the embodiment is set to 60 fps, the timecode generating unit 117 counts up at ¹⁄₆₀-second intervals. The display unit 115 also updates and displays the timecode at ¹⁄₆₀-second intervals.

On the other hand, a "display panel timecode" of FIG. 8 is a timecode generated by the timecode generating unit 124 and is a timecode to be displayed on the display unit 126. The timecode generated by the timecode generating unit 124 is inferior in accuracy to the timecode generated by the timecode generating unit 117 and in the embodiment, the timecode is counted up at ¹⁄₁₅-second intervals (15 Hz). That is, the timecode generating unit 124 counts up the timecode as 0, 4, 8, and so on at ¹⁄₁₅-second intervals in increments of 4 frames, and the display unit 126 updates the screen at 15 Hz. However, it is necessary to maintain the accuracy of the timecode generated by the timecode generating unit 117. Therefore, the timecode generating unit 124 of the embodiment generates a timecode in synchronization with the timecode generating unit 117 at 1-second intervals, for example. Specifically, the microcomputer 108 obtains a timecode from the timecode generating unit 117 and supplies it to the microcomputer 121 at 1-second intervals. The microcomputer 121 achieves synchronization by setting the timecode received from the microcomputer 108 in the timecode generating unit 124. The timecode generating unit 124 counts up the timecode at ¹⁄₁₅-second intervals based on the set timecode.

Figure 4:
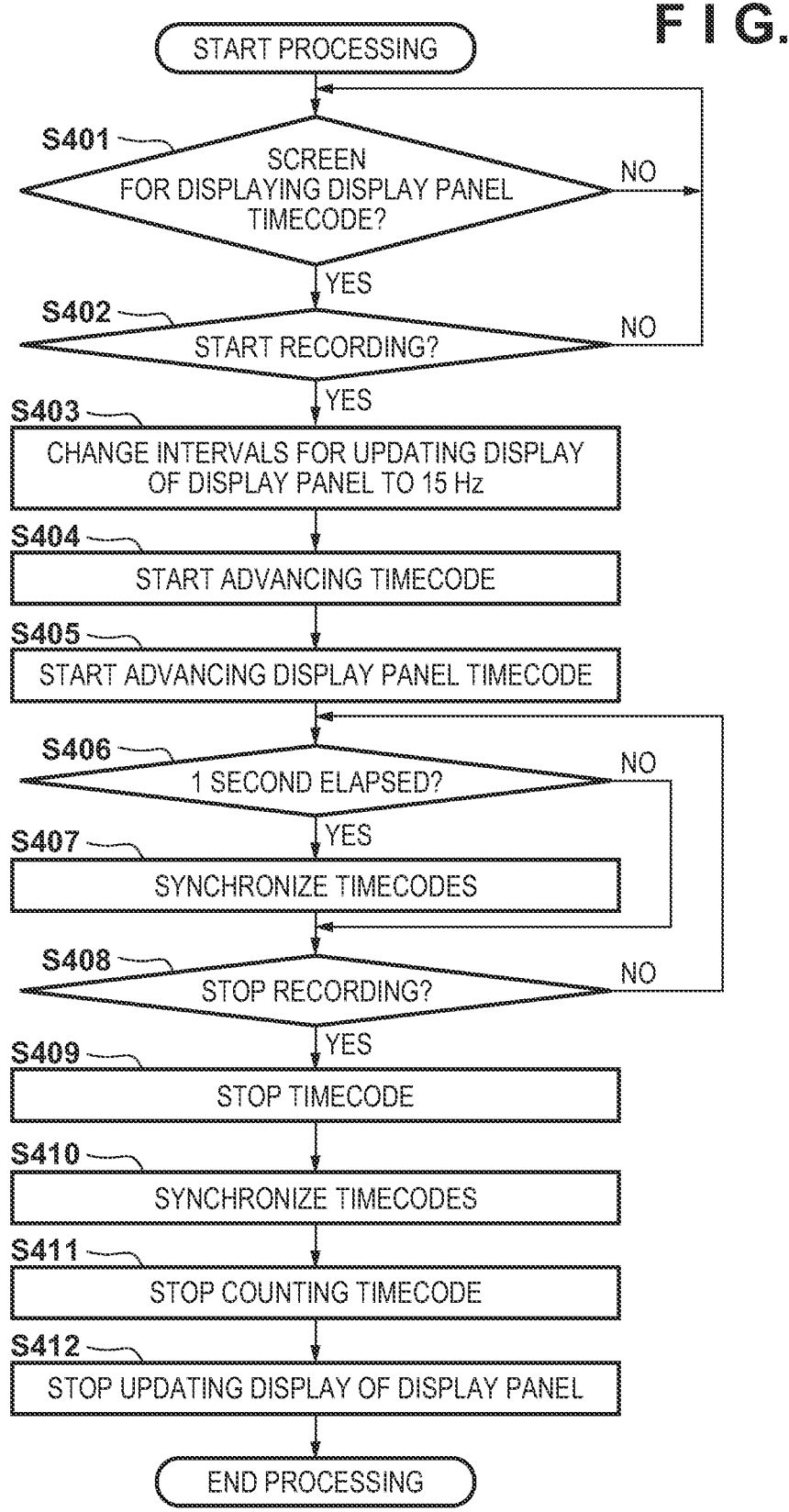
FIG. 4 is an operation flowchart of the first embodiment.

FIG. 4 illustrates an operation flowchart in the present embodiment.

In step S401, when the user inputs from the operation unit 107 an instruction for switching the display screen of the display unit 126 to the timecode display screen, the microcomputer 108 notifies the microcomputer 121 to that effect. Upon receiving this notification, the microcomputer 121 controls the display control unit 125 so as to display the timecode screen by switching the display unit 126 from the screen of FIG. 3B to the screen of FIG. 3A.

Next, the microcomputer 108 waits for the user to press the moving image recording start/stop button of the operation unit 107. The recording start/stop button is a button for instructing a start of recording on a first press and a stop of recording on a second press.

Upon receiving from the operation unit 107 a signal indicating that there has been a press of the moving image recording start/stop button by the user, the microcomputer 108 advances the processing to step S403.

At this time, the microcomputer 108 controls the image capturing device 102, the camera signal processing unit 103, the encode processing unit 112, and the recording unit 104 to start capturing a moving image and recording it on the recording media 105 and 106; however, since that processing is not the main focus of the present disclosure, a description thereof will be omitted.

In step S403, the microcomputer 108 requests that the microcomputer 121 set updating frequency of the display unit 126 to 15 Hz. The microcomputer 121, which has received this request, controls the display control unit 125 to sets the timecode display update frequency to 15 Hz (¹⁄₁₅ second).

In step S404, the microcomputer 108 instructs the timecode generating unit 117 to start advancing the timecode. Further, in step S405, the microcomputer 108 requests that the microcomputer 121 start advancing the timecode. Upon receiving this request, the microcomputer 121 instructs the timecode generating unit 124 to start advancing the timecode.

There almost is no time lag between the above steps S403 and S404. Therefore, the processing of steps S404 and S405 can be said to be the first synchronization processing of the timecode generating unit 117 and the timecode generating unit 124 when the capturing and recording of a moving image is started. In the embodiment, since the frame rate of a moving image is set to 60 fps, there is no particular problem if a time difference between the timecodes of the timecode generating unit 117 and the timecode generating unit 124 is ¹⁄₁₂₀, which is half of ¹⁄₆₀, or less.

In step S406, the microcomputer 108 determines whether or not 1 second has elapsed since it performed the previous synchronization processing. The previous synchronization processing also includes the processing indicated in the above steps S403 and S404.

When the microcomputer 108 determines that 1 second has elapsed from the previous synchronization processing, the microcomputer 108 advances the processing to step S407, and if not, the microcomputer 108 advances the processing to step S408.

In step S407, the microcomputer 108 performs synchronization of the timecode generating units 117 and 124. Specifically, the microcomputer 108 obtains the timecode being counted in the timecode generating unit 117 and notifies it to the microcomputer 121. The microcomputer 121, which has received this notification, then sets the notified timecode in the timecode generating unit 124. As a result, the timecode generating units 117 and 124 count up again from the same timecode.

Meanwhile, in step S408, the microcomputer 108 determines whether there has been input of an instruction for stopping capturing and recording of a moving image by the user (whether there has been another press of the recording start/stop button during the recording of a moving image).

In step S408, if the microcomputer 108 determines that there has been no instruction for stopping recording, the microcomputer 108 returns the processing to step S406 to continue capturing and recording the moving image. As a result, so long as a moving image is being captured and recorded, the timecode generated by the timecode generating unit 117 is displayed on the display unit 115 and the timecode generated by the timecode generating unit 124 is displayed on the display unit 126 (that is, in either case, if the button for displaying a timecode has been operated). The timecode generating units 117 and 124 will be synchronized at 1-second intervals while a moving image is being captured and recorded.

On the other hand, in step S408, if the microcomputer 108 determines that there has been an instruction for stopping recording, the microcomputer 108 advances the processing to step S409.

In step S409, the microcomputer 108 causes the timecode generating unit 117 to stop counting (advancing) the timecode. The microcomputer 108 also stops the capturing of the moving image and the recording of the moving image on the recording medium.

Next, in step S410, the microcomputer 108 performs synchronization of the timecode generating units 117 and 124. When the recording is stopped, the timecode generating unit 117 is counting an accurate timecode, but since the value of the frame, which is the least significant digit position of the timecode counted by the timecode generating unit 124, is a skipping value, such as 0, 4, 8, and so on, the two may not coincide with each other. By performing the processing of step S410, the timecode held by the timecode generating unit 124 can be made to coincide with the timecode held by the timecode generating unit 117.

Then, in step S411, the microcomputer 108 requests that the microcomputer 121 stop counting the timecode. Upon receiving this request, the microcomputer 121 stops the counting of the timecode generating unit 124.

Then, in step S412, the microcomputer 108 stops the display update of the display unit 115 and requests that the microcomputer 121 also stop updating the display. Upon receiving this request, the microcomputer 121 controls the display control unit 125 to stop updating the display unit 126.

As described above, according to the present embodiment, it is possible to shorten the intervals for updating the timecode in the system on the microcomputer 121 side while synchronizing it with the timecode in the system on the microcomputer 108 side for which high processing is desired, at 1-second intervals. Therefore, the user can confirm a highly accurate timecode at the start and end of recording from both the display units 115 and 126.

In the above, a description has been given for an example of displaying a timecode at the time of capturing and recording a moving image. However, irrespective of capturing and recording of a moving image, when the user operates the operation unit 107 to set to a free run for advancing the timecode regardless of whether or not a moving image is being recorded, a loop from step S403 to step S408 may be executed. Then, when the user inputs a stop instruction, the processing exits the loop and transitions to step S409. On the other hand, a configuration may be taken such that when a rec run for advancing the timecode only during recording of a moving image is set, the processing in steps S401 to S412 is performed.

In the above embodiment, it is assumed that the timecode generated by the timecode generating unit 117 is displayed on the display unit 115 at a 60-Hz frequency; however, when a processing unit, such as the camera signal processing unit 103 or the encode processing unit 112, is under a high load, the timecode update frequency may be temporarily set to 30 Hz or the like. As a result, the per-unit-time usage rate of the bus 116 between the display control unit 114 and the timecode generating unit 117 is reduced, and a processing unit whose processing load is high can increase its usage rate (bandwidth) of the bus 116.

In addition, the operation unit may be provided with buttons or switches for selecting to display/hide a timecode and, if display, whether to display on both or only one of the display units 115 and 126.

Furthermore, a configuration may be taken so as to, when there is input of an instruction for displaying a timecode on the display unit 126 when capturing a moving image (when YES in step S401 of FIG. 4), stop the display of the display unit 115 and display the timecode of the display unit 126. In such a case, processing for display, such as live view, becomes unnecessary for the display unit 115, which makes it possible to further reduce power consumption pertaining to the display.

Second Embodiment

Next, a second embodiment will be described. The configuration of the digital camera 100 in the second embodiment is the same as that of the above first embodiment (FIGS. 1 and 2).

Figure 5A:
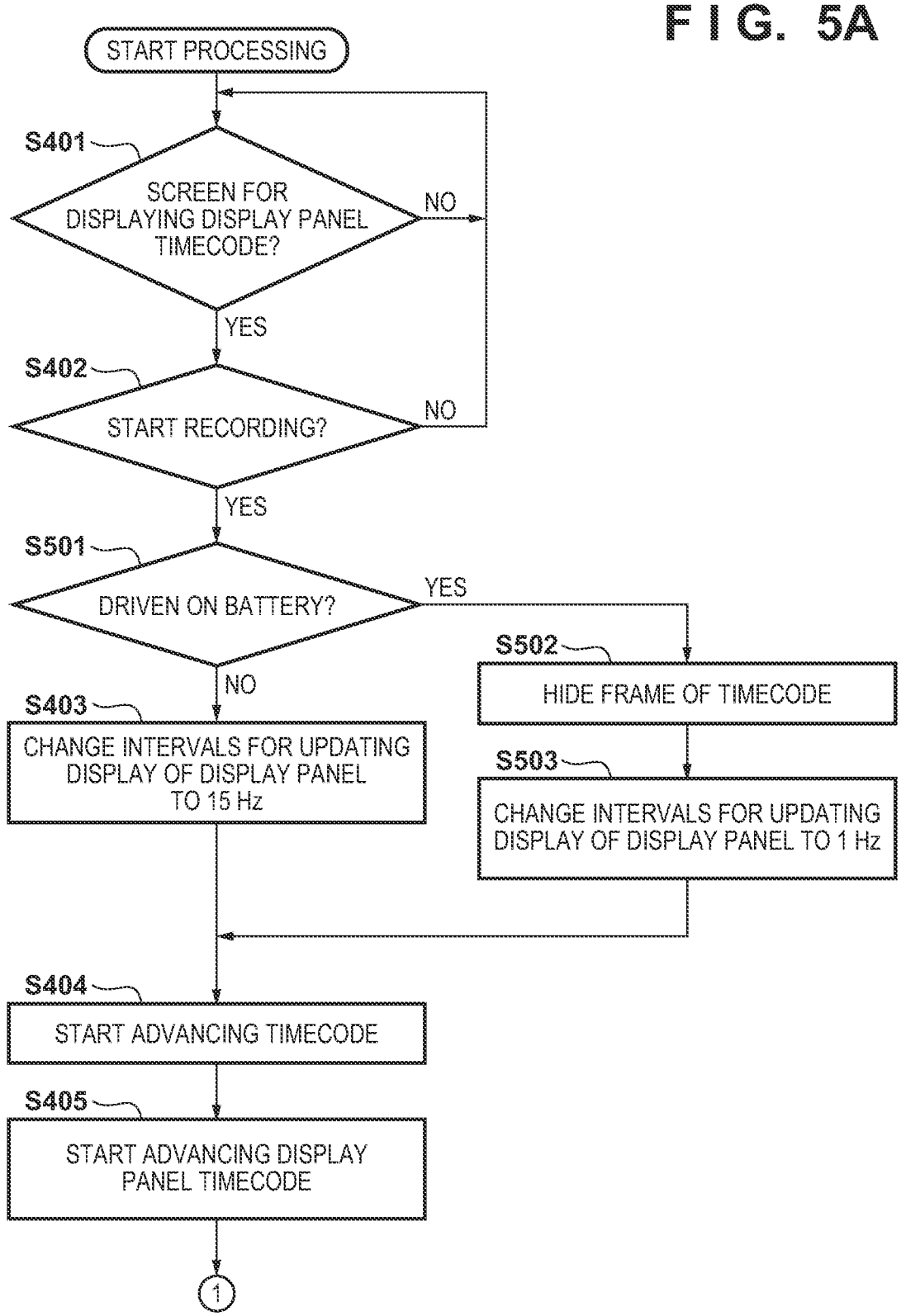
FIGS. 5A and 5B are operation flowcharts of a second embodiment.
Figure 5B:
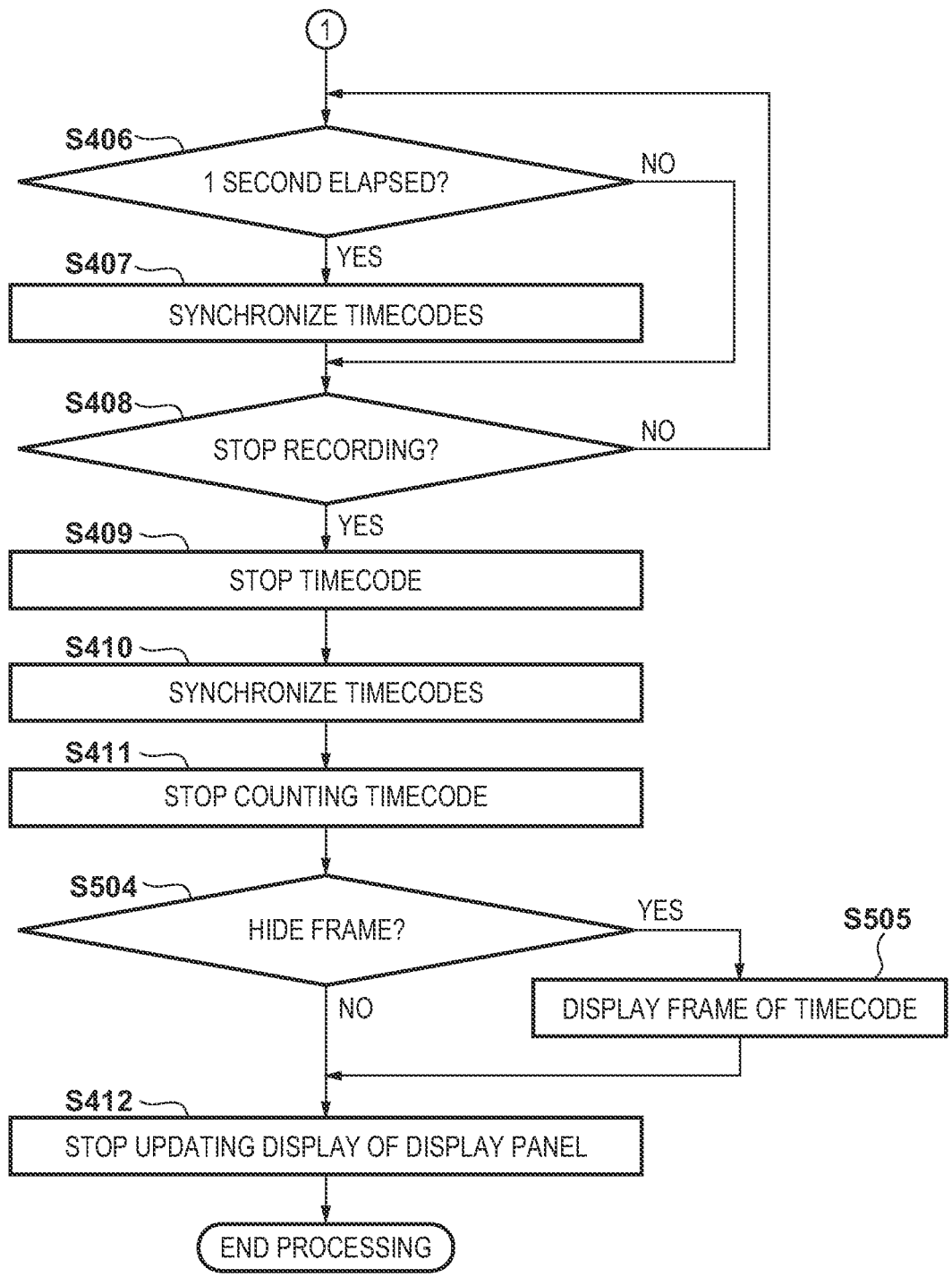

FIGS. 5A and 5B are operation flowcharts in the second embodiment. In FIGS. 5A and 5B, the same reference numbers are given to the processes that are the same as that in FIG. 4, and so a detailed description thereof will be omitted. As previously described, the battery 119 and the AC adapter 150 can be connected to the digital camera 100 in the embodiment.

In step S501, the microcomputer 108 determines whether or not the operation is being performed with power from the battery 119 based on information from the power supply control unit 118. If the microcomputer 108 determines that the operation is being performed with power from the battery 119, the microcomputer 108 advances the processing to step S502. In step S502, the microcomputer 108 requests the microcomputer 121 to hide the frame, which is the least significant digit position before the second of the timecode. In response to receiving this request, the microcomputer 121 controls the display control unit 125 to hide the least significant digit position of the timecode and display the timecode up to the second on the display unit 126. FIG. 6A illustrates an example of a display of a timecode that includes the frame, which is the least significant digit position, and FIG. 6B illustrates an example of a display of a timecode in which the frame, which is the least significant digit position, is hidden. As a result of the processing in step S502, the display unit 126 displays the timecode illustrated in FIG. 6B. Then, in step S503, the microcomputer 108 requests the microcomputer 121 to set the frequency for updating the display unit 126 to 1 Hz (every 1 second). Upon receiving this request, the microcomputer 121 causes the display control unit 125 to set the frequency for updating the screen of the display unit 126 to 1 Hz. At this time, the microcomputer 121 may set the frequency for advancing the timecode to 1 Hz and the advancement units to 60 frames in the timecode generating unit 124.

In step S501, if the microcomputer 108 determines that the operation is being performed with power from the AC adapter 150 (the battery 119 is being charged) based on information from the power supply control unit 125, the microcomputer 108 advances the processing to step S403.

As a result of the above, when power is not being receiving from the AC adapter 150, the frequency for updating the timecode of the display unit 126 is 1 Hz, which makes it possible to further reduce the power consumption in comparison to the first embodiment. In the above, when being driven on the battery 119, the frequency for updating the display of the display unit 126 is set to 1 Hz; however, it may be set to another value (such as 2 Hz) that is lower than a 15-Hz frequency.

In step S408, when the microcomputer 108 determines that there has been input of an instruction for stopping capturing and recording of a moving image by the user, the microcomputer 108 advances the processing to step S409.

In step S409, the microcomputer 108 causes the timecode generating unit 117 to stop counting the timecode. The microcomputer 108 also stops capturing the moving image and recording it on the recording medium. In step S410, the microcomputer 108 performs synchronization of the timecode generating units 117 and 124. In step S411, the microcomputer 108 requests the microcomputer 121 to stop counting the timecode. Upon receiving this request, the microcomputer 121 stops the counting of the timecode generating unit 124.

In step S504, the microcomputer 108 determines whether or not the frame, which is the least significant digit position of the timecode displayed on the display unit 126, is a hidden state. If it is in a hidden state, the microcomputer 108 advances the processing to step S505. In step S505, the microcomputer 108 requests the microcomputer 121 to display the frame, which is the least significant digit position of the timecode. Upon receiving this request, the microcomputer 121 causes the display control unit 125 to display the timecode held by the synchronized timecode generating unit 124 together with the least significant digit position. Consequently, the display of the display unit 126 switches from the state of FIG. 6B to the display illustrated in FIG. 6A.

As described above, according to the second embodiment, when running only on the battery 119, the intervals at which the display of the display unit 126 is updated are made longer (15 Hz→1 Hz) than when running on the power from the AC adapter 150 (external power supply apparatus), which makes it possible to display a timecode for which power consumption has been further reduced. When the recording of a moving image is stopped, the timecode generating unit 117 and the timecode generating unit 124 are synchronized, and all the digit positions of the synchronized timecode can be displayed on the display unit 126.

In the second embodiment, when running only on the battery 119, the number of digit positions of the display of the timecode is reduced, displaying up to the second rather than displaying up to the frame. However, a configuration may be taken so as to, irrespective of being driven with the battery or not, display up to the second while recording a moving image (while the timecode is advancing). In such a case, a configuration may be taken so as to hide the frame of the timecode (display it up to the second) in response to the recording of a moving image being started (Yes in step S402), synchronize the timecode (step S410), and display up to the frame (step S505) in response to the recording of the moving image being stopped (Yes in step S408).

Third Embodiment

Next, a third embodiment will be described. In the third embodiment, it is also assumed that the configuration and the basic operation of the digital camera 100 is the same as those of the first and second embodiments, and so a description thereof will be omitted.

Figure 7A:
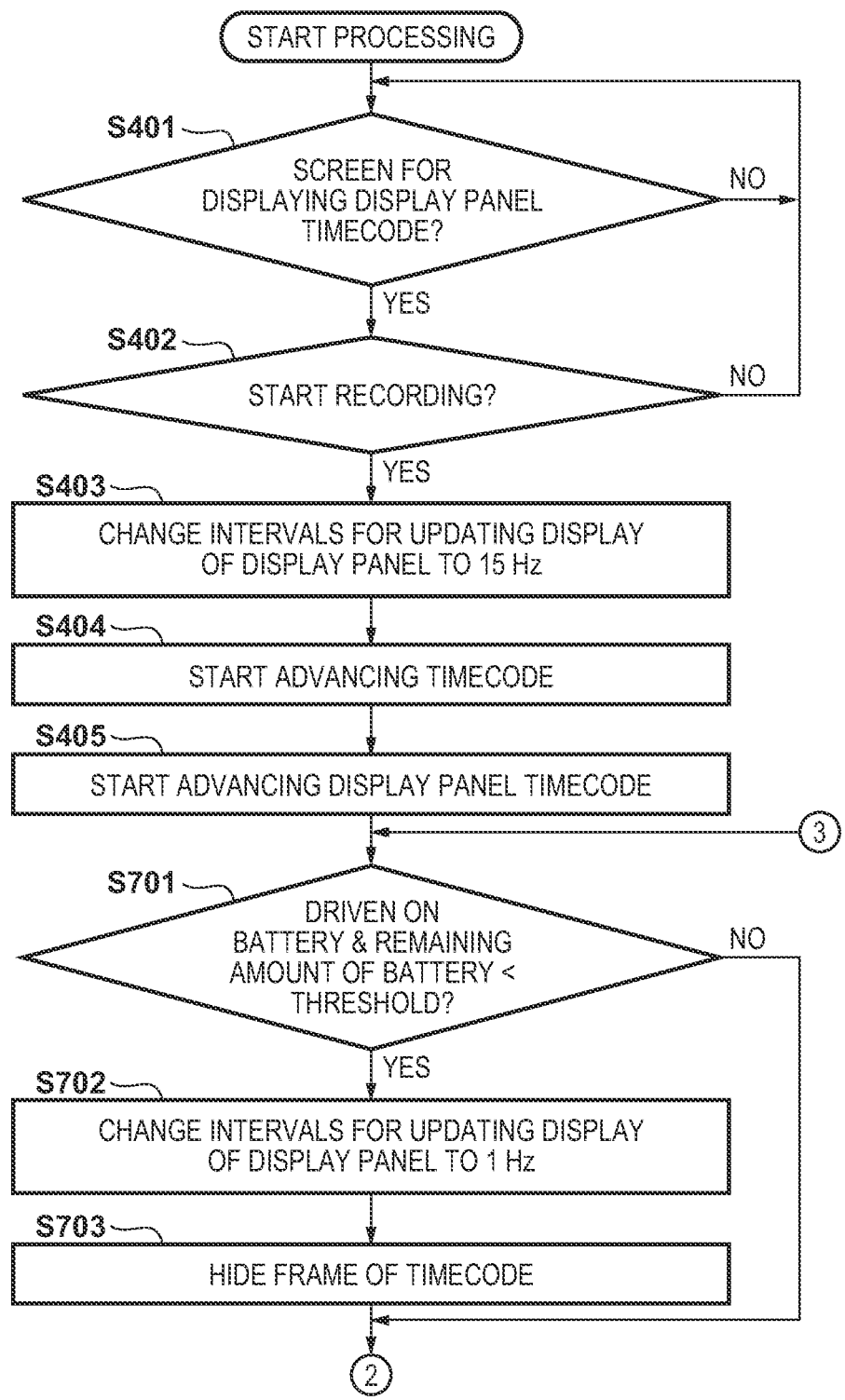
FIGS. 7A and 7B are operation flowcharts of the third embodiment.
Figure 7B:
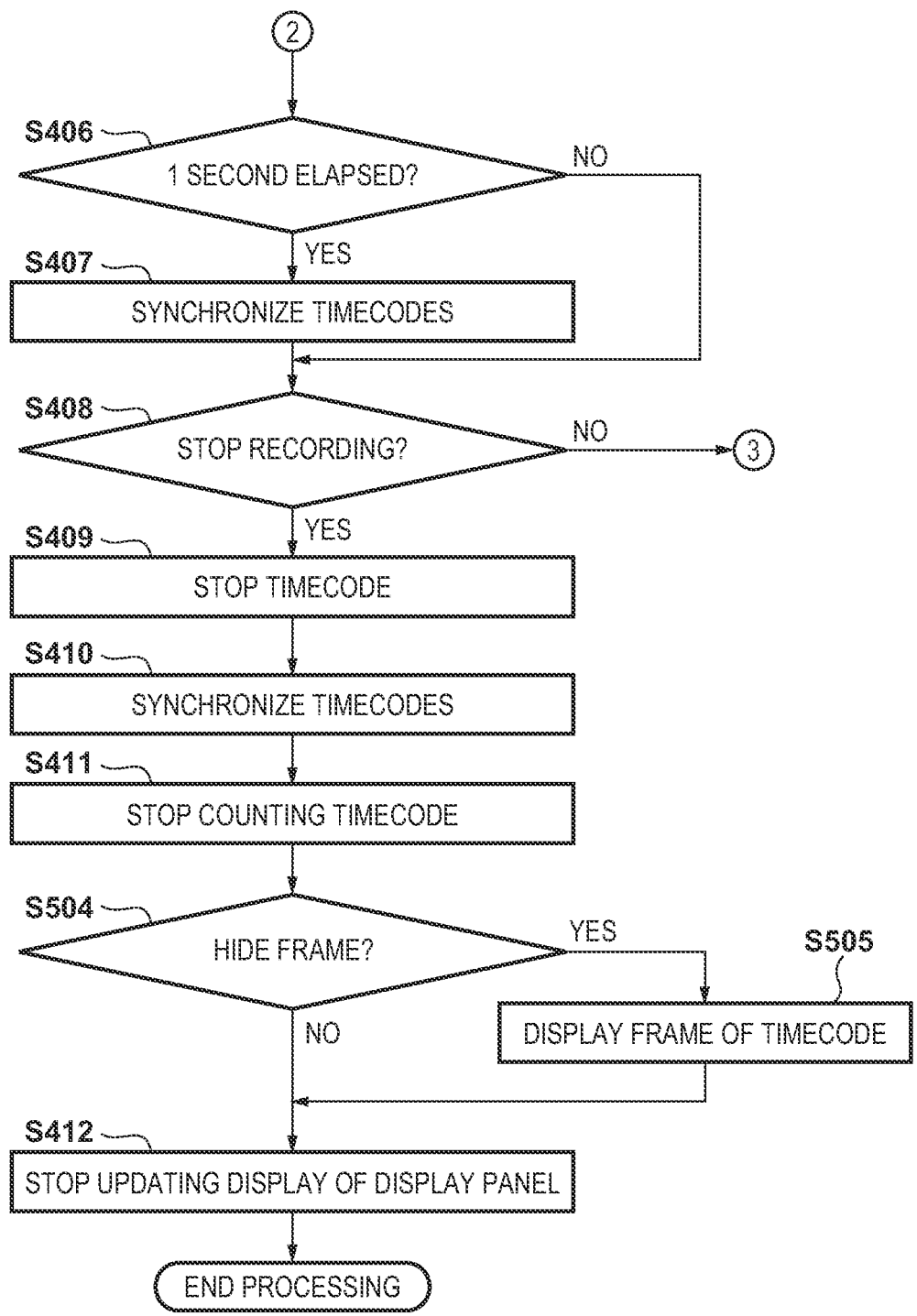

FIGS. 7A and 7B are operation flowcharts in the third embodiment. In FIGS. 7A and 7B, the same reference numbers are given to the processes that are the same as that in FIGS. 4 and 5A and 5B, and so a detailed description thereof will be omitted.

When the capturing and recording of a moving image is started, the microcomputer 108 notifies the microcomputer 121 of the start of the recording. Upon receiving this, the microcomputer 121 controls the display control unit 125 to change the frequency for updating the screen to be displayed on the display unit 126 to 15 Hz. Then, in steps S404 and S405, the timecode generating unit 117 and the timecode generating unit 124 respectively start advancing the timecodes.

In step S701, the microcomputer 108 determines if the digital camera 100 is running on the battery 119 (the AC adapter 150 is not connected) and if the remaining power of the battery 119 is less than a threshold. If the microcomputer 108 determines that this condition is satisfied, the microcomputer 108 advances the processing to step S702. Further, if the microcomputer 108 determines that this condition is not satisfied, that is, if the digital camera is running on power from the AC adapter 150 or is running on the battery 119 and the remaining amount of the battery 119 is equal to or greater than the threshold, the microcomputer 108 advances the processing to step S406.

In step S702, the microcomputer 108 requests the microcomputer 121 set the frequency for the screen of the display unit 126 to 1 Hz so as to reduce power consumption. Upon receiving this request, the microcomputer 121 controls the display control unit 125 to set the frequency for updating the timecode to 1 Hz. Further, the microcomputer 121 sets the frequency for advancing the timecode to 1 Hz and that the timecode be advanced in 60-frame units in the timecode generating unit 124.

Next, in step S703, the microcomputer 108 requests the microcomputer 121 so as to hide the frame, which is the least significant digit position of the timecode to be displayed on the display unit 126. Upon receiving this request, the microcomputer 121 controls the display control unit 125 to set the frame, which is the least significant digit position of the timecode, to a hidden state. As a result, the display screen of the display unit 126 enters the state of FIG. 6B.

Thereafter, the processing is the same as that of the flowcharts of FIGS. 5A and 5B, and so a description thereof will be omitted.

As described above, according to the third embodiment, when the remaining amount of the battery 119 falls below the threshold while capturing and recording a moving image on the power of the battery 119, the screen update of the display unit 126 switches from 15 Hz to 1 Hz, and the frame, which is the least significant digit position of the timecode, becomes hidden. As a result, battery consumption becomes even lower, and the power can be preferentially utilized for recording the moving image.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-211448, which was filed on Dec. 24, 2021 and which is hereby incorporated by reference herein in its entirety.

What is claimed is:

1. An image capturing apparatus including a first display unit capable of displaying a captured image and a second display unit configured to display information related to image capturing, the apparatus comprising:
   a generating unit configured to generate a timecode corresponding to a frame rate at which an image capturing unit performs image capturing;
   a first display control unit configured to control so as to display the timecode generated in the generating unit on the first display unit at first intervals; and
   a second display control unit configured to control so as to display the timecode generated in the generating unit on the second display unit at second intervals that are longer than the first intervals,
   wherein the generating unit includes a first timecode generating unit and a second timecode generating unit,
   wherein the first display control unit controls so as to display a timecode generated in the first timecode generating unit on the first display unit at the first intervals, and
   wherein the second display control unit controls so as to display a timecode generated in the second timecode generating unit on the second display unit at the second intervals.

2. The image capturing apparatus according to claim 1, wherein the second display unit is a display unit that displays information related to image capturing held inside the image capturing apparatus using a symbol including a character and a sign.

3. The image capturing apparatus according to claim 1, wherein the first intervals are of a frequency greater than or equal to the frame rate.

4. The image capturing apparatus according to claim 3, wherein the first intervals are intervals corresponding to the frame rate.

5. The image capturing apparatus according to claim 1, wherein
   the first timecode generating unit is connected to a first bus for processing an image obtained in the image capturing unit, and
   the second timecode generating unit is connected to a bus that is independent from the first bus and whose bandwidth is narrower than a bandwidth of the first bus.

6. The image capturing apparatus according to claim 1, further comprising:
   a synchronization control unit for causing the second timecode generating unit and the first timecode generating unit to synchronize at preset intervals.

7. The image capturing apparatus according to claim 6, wherein
   when there has been input of an instruction for stopping a timecode display,
   the synchronization control unit causes the second timecode generating unit to be synchronized with the first timecode generating unit, and
   the second display control unit displays on the second display unit a timecode held by the second timecode generating unit that has been synchronized and then stops a display update.

8. The image capturing apparatus according to claim 1, wherein during a timecode advancement, the second display control unit controls to display the timecode generated in the second timecode generating unit on the second display unit at the second intervals.

9. The image capturing apparatus according to claim 8, wherein during a timecode advancement, the second display control unit controls so as not to display a timecode of a digit position that is less than a predetermined digit position, and in response to a stop of the timecode advancement, the second display control unit controls so as to display the timecode of the digit position that is less than the predetermined digit position.

10. The image capturing apparatus according to claim 9, wherein during a timecode advancement, the second display control unit controls so as to display a timecode up to a second, and in response to a stop of the timecode advancement, the second display control unit controls so as to display the timecode up to a frame, which is less than the second.

11. The image capturing apparatus according to claim 8, wherein the generating unit advances a timecode during a period from an instruction for starting recording of a moving image captured by the image capturing unit to an instruction for stopping recording of the moving image.

12. The image capturing apparatus according to claim 6, further comprising:
a determination unit configured to determine whether an operation is performed by a power from a battery or a power from an external power supply, wherein
in a case where the determination by the determination unit indicates that the operation is performed on the power from the external power supply, the second display control unit displays the timecode generated in the generating unit on the second display unit at the second intervals,
in a case where the determination by the determination unit indicates that the operation is performed on the power from the battery, the second display control unit displays a timecode excluding a frame, which is the least significant digit position, on the second display unit at 1-second intervals.

13. The image capturing apparatus according to claim 12, wherein
when there has been input of an instruction for stopping a timecode display,
the synchronization control unit causes the second timecode generating unit to be synchronized with the first timecode generating unit, and
the second display control unit displays on the second display unit a timecode that includes the frame, which is the least significant digit position, and is held by the second timecode generating unit that has been synchronized and then stops a display update.

14. The image capturing apparatus according to claim 1, further comprising:
a first determination unit configured to determine whether an operation is performed on a power from a battery or a power from an external power supply; and
a second determination unit configured to determine a remaining amount of the battery, wherein
the second display control unit
in a case where a result of the determination of the first determination unit indicates that the operation is being performed on the power from the battery and the remaining amount of the battery determined in the second determination unit satisfies a condition of falling below a preset threshold, displays a timecode excluding a frame, which is the least significant digit position, on the second display unit at 1-second intervals, and
in a case where the condition is not satisfied, displays the timecode on the second display unit at second intervals.

15. The image capturing apparatus according to claim 6, wherein,
when there has been input of an instruction for stopping a timecode display,
the synchronization control unit causes the second timecode generating unit to be synchronized with the first timecode generating unit, and
the second display control unit displays on the second display unit a timecode that includes a frame, which is the least significant digit position, and is held by the second timecode generating unit that has been synchronized and then stops a display update.

16. A method of controlling an image capturing apparatus including a first display unit capable of displaying a captured image and a second display unit configured to display information related to image capturing, the method comprising:
(a) generating a timecode corresponding to a frame rate at which an image capturing unit performs image capturing;
(b) controlling so as to display the timecode generated in the step (a) on the first display unit at first intervals; and
(c) controlling so as to display the timecode generated in the step (a) on the second display unit at second intervals that are longer than the first intervals,
wherein the step (a) includes generating a timecode in a first timecode generating unit and generating a timecode in a second timecode generating unit,
wherein the step (b) includes displaying the timecode generated in the first timecode generating unit on the first display unit at the first intervals, and
wherein the step (c) includes displaying the timecode generated in the second timecode generating unit on the second display unit at the second intervals.

17. A non-transitory computer-readable storage medium storing a program which, when read and executed by a computer, causes the computer to execute the steps of a method of controlling an image capturing apparatus including a first display unit capable of displaying a captured image and a second display unit configured to display information related to image capturing, the method comprising:
(a) generating a timecode corresponding to a frame rate at which an image capturing unit performs image capturing;
(b) controlling so as to display the timecode generated in the step (a) on the first display unit at first intervals; and
(c) controlling so as to display the timecode generated in the step (a) on the second display unit at second intervals that are longer than the first intervals,
wherein the step (a) includes generating a timecode in a first timecode generating unit and generating a timecode in a second timecode generating unit,
wherein the step (b) includes displaying the timecode generated in the first timecode generating unit on the first display unit at the first intervals, and
wherein the step (c) includes displaying the timecode generated in the second timecode generating unit on the second display unit at the second intervals.

* * * * *